Figure 1:
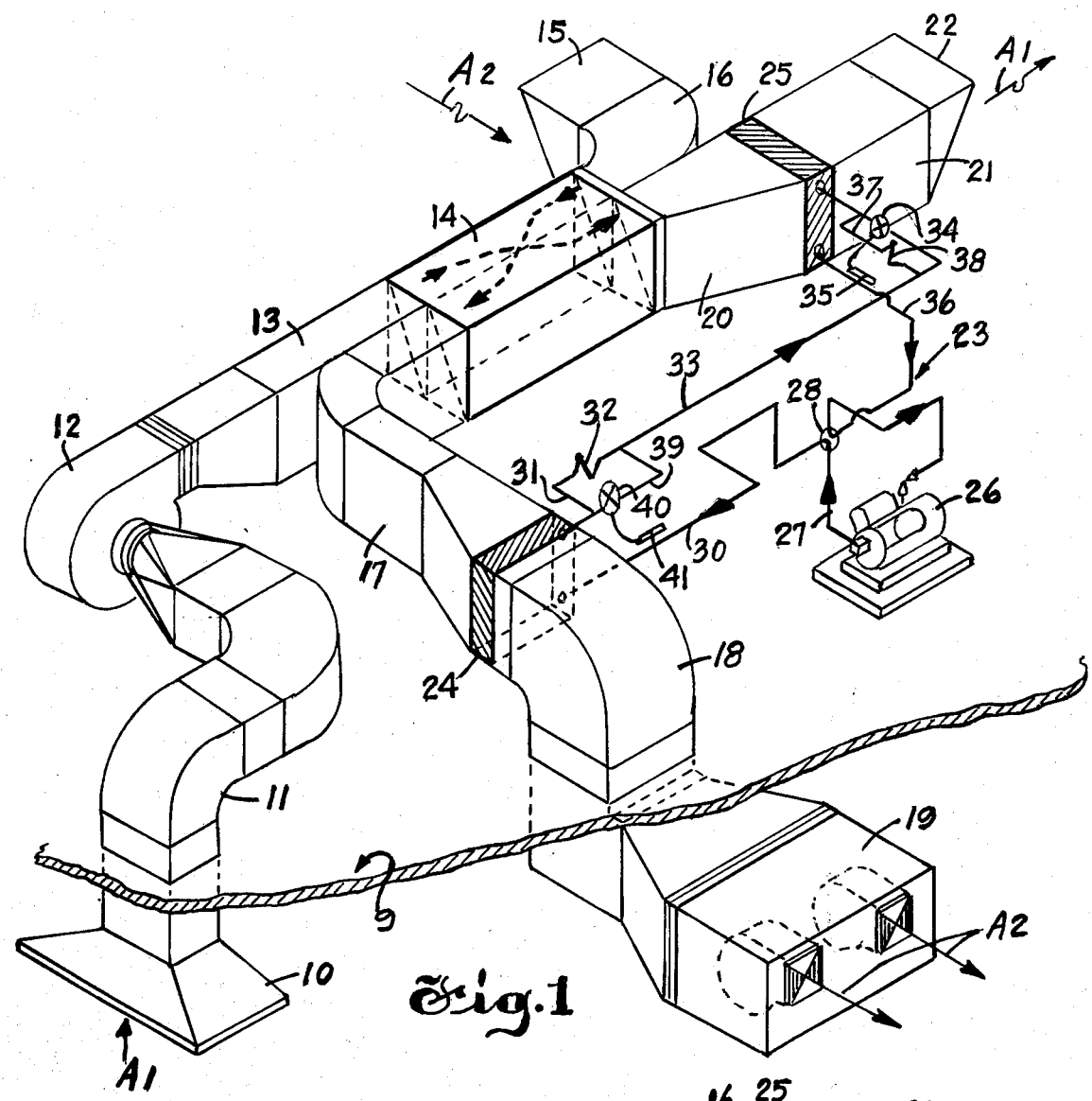

United States Patent [19]

Bridgers

[11] 4,071,080
[45] Jan. 31, 1978

[54] AIR CONDITIONING SYSTEM

[76] Inventor: Frank H. Bridgers, 712 Hermosa Drive, NE., Albuquerque, N. Mex. 87110

[21] Appl. No.: 648,879

[22] Filed: Jan. 14, 1976

[51] Int. Cl.$^2$ .................. F24C 15/20; F24F 7/00; A23C 3/02

[52] U.S. Cl. .......................... 165/59; 62/79; 62/412; 126/299 D; 165/62; 165/66; 165/DIG. 2; 165/DIG. 12

[58] Field of Search .............. 165/62, 66, 59, DIG. 2, 165/DIG. 12; 62/79, 412; 98/33 R; 126/117, 299 R, 299 D; 34/86

[56] References Cited

U.S. PATENT DOCUMENTS

| | | | |
|---|---|---|---|
| 2,011,117 | 8/1935 | Richter | 165/66 X |
| 2,044,951 | 6/1936 | Munters | 62/79 |
| 2,898,745 | 8/1959 | Weisel | 165/62 X |
| 3,135,318 | 6/1964 | Carleton | 165/62 X |
| 3,581,649 | 6/1971 | Rauenhorst | 165/66 X |
| 3,726,202 | 4/1973 | Ahlberg | 98/33 R |
| 3,827,343 | 8/1974 | Darm | 165/66 |
| 3,946,575 | 3/1976 | Barr et al. | 98/33 R |
| 3,952,947 | 4/1976 | Saunders | 165/62 X |

Primary Examiner—Charles J. Myhre
Assistant Examiner—Sheldon Richter
Attorney, Agent, or Firm—William L. Scherer

[57] ABSTRACT

An air conditioning system comprising a heat exchanger using the conduction principle to impart a portion of the heating or cooling from the air exhausted from a building or facility to a make-up air supply and a heat pump which provides supplemental heating or cooling for the make-up air supply to bring it to the desired temperature for use in the building or facility.

2 Claims, 2 Drawing Figures

U.S. Patent  Jan. 31, 1978  4,071,080

AIR CONDITIONING SYSTEM

The present invention relates to an air conditioning system incorporating a heat exchanger or the like and a heat pump to provide heating or cooling as required to prepare make-up air introduced to a building or similar enclosed area thereby providing the proper predetermined temperature for creature comfort or the satisfactory atmosphere for a manufacturing facility.

In the treatment of air for a building or similar enclosed area it is customary to either refrigerate or heat the air before introducing it into the facility. Ordinarily, a portion of the air within the structure is exhausted and a like quantity of air is introduced as make-up air. In summer, it is necessary to cool this make-up air and in the winter it must be subjected to heat.

The use of conventional heating or cooling systems ordinarily fails to make use of the temperature of the exhausted air to condition the make-up air supply and thus requires the expenditure of considerable energy to produce the desired room temperature both in the winter and summer.

The present invention, however, employs the air exhausted from the building to heat or cool the make-up air supply by conduction through the medium of a heat exchanger or the like. This procedure results in a normal recovery of from 40 to 70% of the heating or cooling from the exhaust air.

The remainder of the heating required for the make-up air supply is provided by a heat pump system which is essentially an electric refrigeration cycle in which the exhaust air is cooled by the evaporator coil in the exhaust air stream and the heat absorbed by the evaporator coil plus the heat of compression added by the electrical energy to drive the compressor is rejected to the condenser coil located in the make-up air stream.

When supplemental cooling is required and the make-up air supply must be cooled, the refrigerant flow in the heat pump system can be reversed by a four-way solenoid valve to allow the coil in the make-up air stream to act as the evaporator coil and the coil in the exhaust air stream to act as the condenser coil. The heat pump is a most efficient cooling system to both cool and dehumidify outside air to temperature levels compatible to normal air conditioning design at a higher efficiency than could normally be obtained by a conventional air-cooled refrigeration unit.

Thus, the present invention contemplating the use of a heat exchanger and a heat pump achieves a most efficient air conditioning system the operation of which demands a minimum energy supply for heating and cooling service.

It is, therefore one of the purposes of the present invention to create an improved air conditioning system with more efficient use of scarce and costly energy.

It is a further purpose to employ the well known recovery advantages of a heat exchanger or other similar conduction type unit with a heat pump as a supplementary means of providing heating and cooling alternatively as may be required to properly condition the air introduced into an enclosed area or building for all normal useage thereof.

Many other objects and purposes will become apparent as the following description of a preferred embodiment of the present invention proceeds.

Referring to the drawing, FIG. 1 is a schematic illustration of the air conditioning system of the present invention showing a typical installation on the roof of an enclosed area or building and indicates the operation of the system in the winter cycle.

Figure 2:
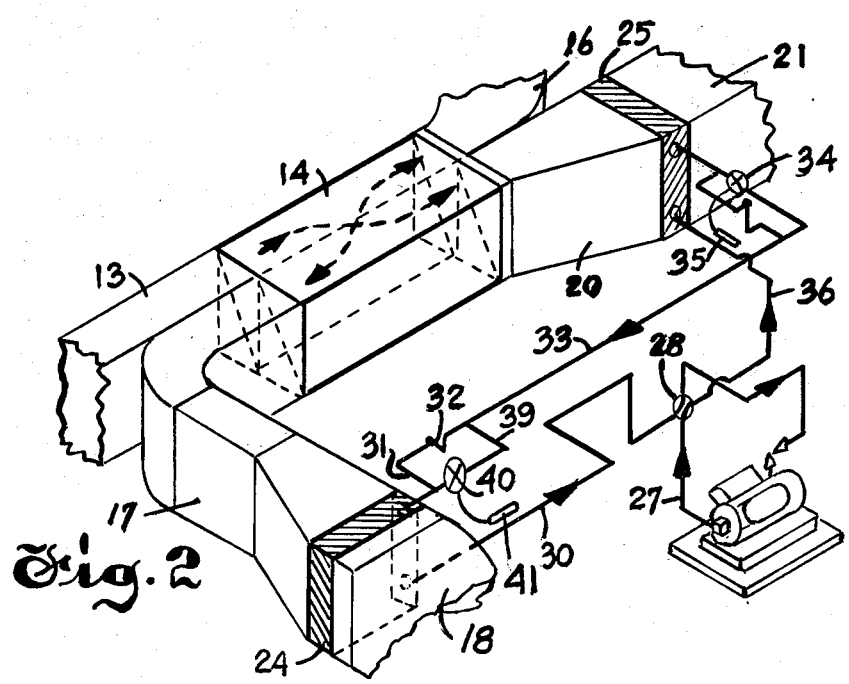

FIG. 2 is a partial view to illustrate the operation of the system of the present invetnion during the summer cycle.

In FIG. 1, the roof portion of the building mentioned above is identified by the reference numeral 9 with an exhaust hood 10 disposed internally of the building and directly under said roof. As previously indicated, FIG. 1 illustrates the air conditioning system in its winter cycle in which the building is to be heated. A portion of the air A(1) is exhausted through the hood 10 and duct 11 by the exhaust fan 12 disposed above the roof 9. The discharged end of the exhaust fan 12 is connected through suitable ductwork 13 to the inner chamber of an air-to-air type heat exchanger 14 of any suitable conventional design.

A "run-around coil" or "heat pipe" heat recovery system both of which, like the heat exchanger shown, impart heat or cooling by conduction from a supply of exhaust gas or air to fresh air introduced to spaced enclosed sealed channels within the inner chamber of the device. All of such devices are well known in the heating and ventilating art.

A make-up air supply A(2) is supplied from the ambient air outside the building proper through an inlet or intake hood 15. The make-up air A(2) is directed by means of the ducts 16 through sealed inner channels internally of and extending longitudinally within the enclosed chamber of the heat exchanger 14 through which it is directed by means of the ducts 17 and 18 and drawn by the blower unit 19 located inside the area to be heated and directly under the roof 9 of the building.

After the air supply A(1) has transmitted heat to the make-up air supply A(2) by conduction in its passage through the heat exchanger 14, it is exhausted through the ducts 20 and 21 and the discharge outlet 22 to the exterior of the building or enclosed area. To supplement the heat introduced to the make-up air supply A(2) before it is discharged by the unit 19 into the space to be heated, it is subjected to additional heat by means of a heat pump system 23 to bring the temperature to a suitable level for creature comfort or for the conduct of certain operations within the enclosed area.

The heat pump system 23 embodies a coil 24 (employed in the winter cycle as a condensing coil) disposed between the ducts 17 and 18 and a similar coil 25 (serving in the winter cycle as an evaporator coil) between the ducts 20 and 21. A compressor unit 26 is also a part of the heat pump system 23 and is connected by suitable piping 27 to a four-way solenoid operated reversing valve 28. This reversing valve 28 and the compressor 26 are controlled by a thermostat (not shown) located in the enclosed area to cause the system to deliver heating or cooling as desired.

A fluid medium or refrigerant such, for example, as Freon or the like, is used in the heat pump system 23. The flow of the medium through the compressor unit 26 is always in the same direction as demonstrated by the arrows in the piping. However, the direction of flow of the medium in the remainder of the heat pump system 23 to achieve heating or cooling is the function of the reversing valve 28. The ports of the reversing valve 28 are disposed as shown in FIG. 1.

In the winter cycle, the reversing valve 28 is so positioned that the fluid medium or refrigerant, hereinafter referred to as Freon, is passed from the compressor unit 26 through the piping 27, the valve 28 and piping 30 to the coil 24. As the Freon traverses through the coil 24, now serving as a condenser, it imparts heat to the make-up air supply A2 as it passes therethrough from the duct 17 to duct 18 under the influence of the blower unit 19. The Freon now exits from the upper end of the coil 24 through the piping 31, check valve 32 and piping 33 to an expansion valve 34 which is a pressure sensitive metering type valve activated by a sensor 35 to control flow of the Freon into the coil 25, now serving as an evaporator.

The Freon exits from the coil 25 through piping 35, the other side of the reversing valve 28 and piping 36 to the compressor unit 26. In its passage through the coil 25, the Freon picks up some supplemental heat from the air supply A1 as it is discharged through the ducts 20 and 21 and the discharge outlet 22 to the exterior of the building or enclosed area.

In the summer cycle illustrated partially and schematically in FIG. 2, the flow of Freon through the system is reversed as a result of directing the reversing valve 28 to produce cooling temperatures. Thus, the ports in valve 28 are disposed as shown in FIG. 2 and the flow of Freon is shown by the arrows in the piping.

As explained in the description of the winter cycle of FIG. 1, the enclosed area defined by the roof 9 is now to be subjected to cooling during the summer cycle. In the same way, a portion of the air supply A(1) is drawn through the exhaust hood 10 and duct 11 by the exhaust fan 12. The air supply A(1) is now warm but at a lower temperature than the ambient temperature outside the building. Thus, as the air supply A(1) is passed through the heat exchanger 14 the device now serves to lower the temperature of the ambient make-up air supply A(2) drawn in through the intake hood 15, the ducts 16 and connecting ducts 17 and 18 by the blower unit 19.

After the make-up air supply A(2) has absorbed some of the cooling effect from the air supply A(1) by conduction, the latter is discharged through the ducts 20 and 21 and discharge outlet 22 to the exterior of the building. As the air supply A(1) passes through the coil 25 between ducts 20 and 21 it imparts some of its heat to the Freon passing through the coil. As previously indicated, the reversing valve 28 now delivers the refrigerant directed by the compressor unit 26, piping 29 and 25 to the lower end of the coil 25. In its passage through the coil 25, the Freon absorbs some cooling effect from the air supply A(1) in its passage through ducts 20 and 21 toward the discharge outlet 22.

The Freon now emerges from the upper end of coil 25 through piping 37 and check valve 38 by-passing the expansion valve 34. After passing through the check valve 38, the Freon is directed through piping 33 and 39 through the expansion valve 40 which is identical to the expansion valve 34 hereinbefore described. The refrigerant is introduced to the coil 25 through the pressure sensitive metering action of the expansion valve 40 controlled by the sensor 41 in piping 30. As the make-up air supply A(2) passes through the coil 24, its temperature is reduced to the desired comfort level predetermined by the thermostat.

It will be readily understood that the apparatus hereinbefore described may be assembled and operated in somewhat different manner without actually departing from the spirit of the invention. For example, instead of relying on the heating or cooling effect created by the air supply A(1) in operating the heat exchanger 14, any air or gaseous medium normally discharged from a manufacturing process may conveniently be used to heat or cool the make-up air supply A(2). To this extent, the heat exchanger principle is most adaptable and versatile.

Similarly, the heat pump is exceedingly advantageous. In the heat cycle such equipment makes efficient use of low electrical input in that each unit of electrical power to the compressor enables the apparatus to pick up two free heat units from the outdoor or ambient air regardless of temperature. The unit of electrical input is then changed to a heating unit so that all three units are released to the enclosed area to be heated. In the cooling cycle, the apparatus is basically the same equipment as the standard refrigeration type air conditioner of air-to-air design.

In view of the present necessity to conserve natural gas energy, fuel oil and fossil fuels, the ability to use a minimum of electrical power to produce the needed air conditioning service for winter and summer is an important unexpected result achieved by the combination of features defined herein.

While only one of the preferred embodiments of the invention has been shown and described, it is contemplated that various changes and substitutions may be made without departing from the spirit or scope of the invention. It is desired that the invention be limited only to the extent defined by the accompanying claims.

I claim:

1. An air conditioning system for heating and cooling the air in an enclosed area; means for exhausting a portion of the air from the enclosed area; an outlet from which the air exhausted from the enclosed area is discharged; an inlet for supplying ambient make-up air to the system to replace the air discharged; a heat exchanger disposed between the exhaust means and the discharge outlet to enable the exhaust air passing therethrough to treat the make-up air by conduction; means for introducing the treated make-up air to the enclosed area; a heat pump in the system for providing supplemental treatment of the make-up air to that induced by the heat exchanger; said heat pump embodying a compressor; a first coil member disposed in the path of the exhaust air between the heat exchanger and the discharge outlet and alternating as an evaporator and a condenser; a second coil member disposed in the path of the make-up air between the heat exchanger and the blower for introducing the make-up air to the enclosed area and alternating as a condenser and an evaporator; and valve means operating alternately to direct the flow of fluid through the first and second coil members thereby providing heating and cooling as required for the make-up air supply.

2. An air conditioning system as defined in claim 1 in which the heat pump embodies an expansion type metering valve between the compressor and each coil; each of said metering valves being controlled by a sensor to direct the course of the fluid through the coils as dictated by the need for heating and cooling of the make-up air supply.

* * * * *